(12) United States Patent
Jeong et al.

(10) Patent No.: US 11,681,202 B2
(45) Date of Patent: Jun. 20, 2023

(54) CAMERA MODULE

(71) Applicant: Samsung Electro-Mechanics Co., Ltd., Suwon-si (KR)

(72) Inventors: Bong Won Jeong, Suwon-si (KR); Bo Sung Seo, Suwon-si (KR); Jae Hyuk Lee, Suwon-si (KR); Young Bok Yoon, Suwon-si (KR); Sung Hoon Kim, Suwon-si (KR); Jung Seok Lee, Suwon-si (KR); Soo Cheol Lim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 266 days.

(21) Appl. No.: 16/919,420

(22) Filed: Jul. 2, 2020

(65) Prior Publication Data
US 2021/0048730 A1 Feb. 18, 2021

(30) Foreign Application Priority Data

Aug. 16, 2019 (KR) .................. 10-2019-0100295
Dec. 30, 2019 (KR) .................. 10-2019-0178490

(51) Int. Cl.
*G03B 5/04* (2021.01)
*G03B 13/34* (2021.01)
*G02B 27/64* (2006.01)

(52) U.S. Cl.
CPC ............. *G03B 5/04* (2013.01); *G02B 27/646* (2013.01); *G03B 13/34* (2013.01); *G03B 2205/0015* (2013.01); *G03B 2205/0069* (2013.01)

(58) Field of Classification Search
CPC .. G03B 5/04; G03B 13/34; G03B 2205/0015; G03B 2205/0069; G02B 27/646
See application file for complete search history.

(56) References Cited

U.S. PATENT DOCUMENTS 10,003,746 B2   6/2018  Minamisawa
2007/0257989 A1 11/2007 Shirono
(Continued)

FOREIGN PATENT DOCUMENTS

CN    101067709 A    11/2007
CN    101246293 A    8/2008
(Continued)

OTHER PUBLICATIONS

Chinese Office Action dated Jul. 30, 2021, in counterpart Chinese Patent Application No. 202010811841.6 (6 pages in English and 10 pages in Chinese).
(Continued)

*Primary Examiner* — Clayton E. LaBalle
*Assistant Examiner* — Diana Hancock
(74) *Attorney, Agent, or Firm* — NSIP Law (57) ABSTRACT

A camera module includes a lens holder accommodating a lens module therein, a housing accommodating the lens module and the lens holder therein, a shake correction unit including first and second magnets, disposed in the lens holder, and first and second coils disposed to face the first and second magnets, a focusing unit including a third magnet, disposed in the lens module, and a third coil disposed on a first substrate disposed on the lens holder, and a plurality of ball members configured to support movement of the lens module in a direction perpendicular to an optical axis. The lens module, the lens holder, the third magnet, and the third coil are moved together in the direction perpendicular to the optical axis, by driving force of the shake correction unit.

18 Claims, 6 Drawing Sheets

(56) References Cited

U.S. PATENT DOCUMENTS

| | | |
|---|---|---|
| 2008/0198462 A1 | 8/2008 | Sekino |
| 2012/0200176 A1 | 8/2012 | Park |
| 2013/0163085 A1 | 6/2013 | Lim et al. |
| 2015/0296112 A1* | 10/2015 | Park .................. G02B 27/646 348/208.7 |
| 2015/0346453 A1* | 12/2015 | Cheong .............. H04N 5/2257 359/826 |
| 2015/0373272 A1 | 12/2015 | Lim et al. |
| 2016/0154204 A1* | 6/2016 | Lim .................... G02B 27/646 359/557 |
| 2016/0241786 A1 | 8/2016 | Minamisawa |
| 2016/0269644 A1* | 9/2016 | Cheong ................ H04N 5/232 |
| 2016/0299349 A1 | 10/2016 | Cho |
| 2017/0343886 A1 | 11/2017 | Park et al. |
| 2018/0309916 A1 | 10/2018 | Park et al. |
| 2019/0141219 A1 | 5/2019 | Oh et al. |
| 2019/0162930 A1* | 5/2019 | Min .................... G02B 27/646 |
| 2020/0174272 A1* | 6/2020 | Minamisawa .......... G03B 5/04 |

FOREIGN PATENT DOCUMENTS

| | | | |
|---|---|---|---|
| CN | 102629815 A | 8/2012 | |
| CN | 103176331 A | 6/2013 | |
| CN | 105278208 A | 1/2016 | |
| CN | 105589278 A | 5/2016 | |
| CN | 105593757 A | 5/2016 | |
| CN | 105652557 A | 6/2016 | |
| CN | 106054494 A | 10/2016 | |
| CN | 109061979 A | 12/2018 | |
| CN | 109597148 A | 4/2019 | |
| CN | 109683428 A | 4/2019 | |
| CN | 109765671 A | 5/2019 | |
| JP | 2015-84003 A | 4/2015 | |
| KR | 10-2014-0110381 A | 9/2014 | |
| KR | 10-2015-0117235 A | 10/2015 | |
| KR | 10-2016-0063329 A | 6/2016 | |
| KR | 10-2016-0121298 A | 10/2016 | |
| KR | 20160121298 A * | 10/2016 | ............... G02B 7/09 |
| KR | 10-2018-0024145 A | 3/2018 | |
| KR | 10-2018-0071223 A | 6/2018 | |
| WO | WO-2015045792 A1 * | 4/2015 | ........... G02B 27/644 |

OTHER PUBLICATIONS

Korean Office Action dated Feb. 18, 2021 in counterpart Korean Patent Application No. 10-2019-0178490 (7 pages in English and 6 pages in Korean).

* cited by examiner

CAMERA MODULE

CROSS-REFERENCE TO RELATED APPLICATIONS

This application claims the benefit under 35 USC 119(a) of Korean Patent Application Nos. 10-2019-0100295 filed on Aug. 16, 2019, and 10-2019-0178490 filed on Dec. 30, 2019, in the Korean Intellectual Property Office, the entire disclosures of which are incorporated herein by reference for all purposes.

BACKGROUND

1. Field

This application relates to a camera module.

2. Description of the Background

Recently, camera modules have been used in mobile communications terminals such as tablet personal computers (PCs), laptop computers, and the like, as well as in smartphones.

The camera module is provided with an actuator moving a lens module to perform a focusing function and a shake correction function. The actuator moves the lens module in an optical axis direction and a direction perpendicular to an optical axis, using driving force generated by a magnet and a coil.

However, since the lens module is moved in the optical axis direction during a focusing operation, a relative position of a magnet and a coil for shake correction (a position of the magnet and the coil in the optical axis direction) may also vary.

When the relative position of the magnet and the coil for shake correction (the position of the magnet and the coil in the optical axis direction) varies, it may be difficult to precisely control driving force generated by the magnet and the coil for shake correction (driving force in the direction perpendicular to the optical axis).

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens holder accommodating a lens module therein, a housing accommodating the lens module and the lens holder therein, a shake correction unit including first and second magnets, disposed in the lens holder, and first and second coils disposed to face the first and second magnets, a focusing unit including a third magnet, disposed in the lens module, and a third coil disposed on a first substrate disposed on the lens holder, and a plurality of ball members configured to support movement of the lens module in a direction perpendicular to an optical axis. The lens module, the lens holder, the third magnet, and the third coil are moved together in the direction perpendicular to the optical axis, by driving force of the shake correction unit.

The first substrate may be moved in the direction perpendicular to the optical axis, by the driving force of the shake correction unit in a state in which a portion of the first substrate is connected to the housing.

The first substrate may include a body portion, provided with the third coil, and an extension portion bent to extend from the body portion.

The extension portion may include a first extension portion, bent to extend from one side of the body portion to be spaced apart from the body portion, and a second extension portion bent to extend from the first extension portion.

The second extension portion may be disposed to be spaced apart from a side surface of the lens holder.

The second extension portion may include a connection portion configured to receive an electrical signal from an external component, and the connection portion may be disposed on the housing.

The first extension portion may be moved in a second axis direction perpendicular to the optical axis, by driving force generated by the second magnet and the second coil.

The second extension portion may be moved in a first axis direction perpendicular to the optical axis, by driving force generated by the first magnet and the first coil.

The lens module may include a lens barrel and a carrier coupled to the lens barrel, and a rolling member may be disposed between the carrier and the lens holder.

A stopper, covering at least a portion of an upper surface of the carrier, may be disposed on the lens holder.

The stopper may include a protrusion covering an upper portion of the rolling member.

The third coil may be disposed closer to an optical axis of the lens module than the first and second coils.

The shake correction unit may further include a frame for guiding the movement of the lens module. The frame, the lens holder, and the lens module may be moved together in a first axis direction perpendicular to the optical axis, by driving force generated by the first magnet and the first coil. The lens holder and the lens module may be moved in a second axis direction perpendicular to the optical axis, by driving force generated by the second magnet and the second coil.

In another general aspect, a camera module includes a lens holder accommodating a lens module therein, a housing accommodating the lens module and the lens holder therein, a shake correction unit including first and second magnets, disposed in the lens holder, and first and second coils disposed to face the first and second magnets, a focusing unit including a third magnet, disposed in the lens module, and a third coil disposed on a first substrate disposed on the lens holder, and a plurality of ball members configured to support movement of the lens module in a direction perpendicular to an optical axis. The first substrate is moved in the direction perpendicular to the optical axis, by driving force of the shake correction unit in a state in which a portion of the first substrate is connected to the housing.

The lens module, the lens holder, the third magnet, and the third coil may be moved together in the direction perpendicular to the optical axis, by the driving force of the shake correction unit.

The first substrate may include a body portion provided with the third coil, a first extension portion bent to extend from one side of the body portion to be spaced apart from the body portion, and a second extension portion bent to extend from the first extension portion, and the first extension portion may be moved in a second axis direction perpendicular to the optical axis, by driving force generated by the second magnet and the second coil.

The second extension portion may be moved in a first axis direction perpendicular to the optical axis, by driving force generated by the first magnet and the first coil.

In another general aspect, a camera module includes a lens holder disposed in a housing and configured to move in first and second directions perpendicular to an optical axis direction relative to the housing, a lens module disposed in the lens holder and configured to move in an optical axis direction relative to the lens holder, a substrate disposed on the lens holder comprising a body portion configured to move with the lens holder and a connection portion connected to the housing, and a driving coil disposed on the body portion to face a driving magnet on the lens module to drive the lens module in the optical axis direction.

The substrate may include a first extension portion extending from a first bent portion connected to a side of the body portion to a second bent portion, and a second extension portion extending from the second bent portion to the connection portion, the first extension portion may be configured to move in the first direction relative to the body portion and the second extension portion in response to the lens holder movement in the first direction, and the second extension portion may be configured to move in the second direction relative to the first extension portion and the connection portion in response to the lens holder movement in the second direction.

The camera module may further include first and second magnets, disposed in the lens holder, and first and second coils disposed to face the first and second magnets to drive the lens holder in the first and second directions.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

An aspect of the present disclosure is to provide a camera module, capable of improving focusing performance and shake correction performance.

This disclosure relates to a camera module that may be used in a portable electronic device such as a mobile communications terminal, a smartphone, or a tablet personal computer (PC).

Figure 1:
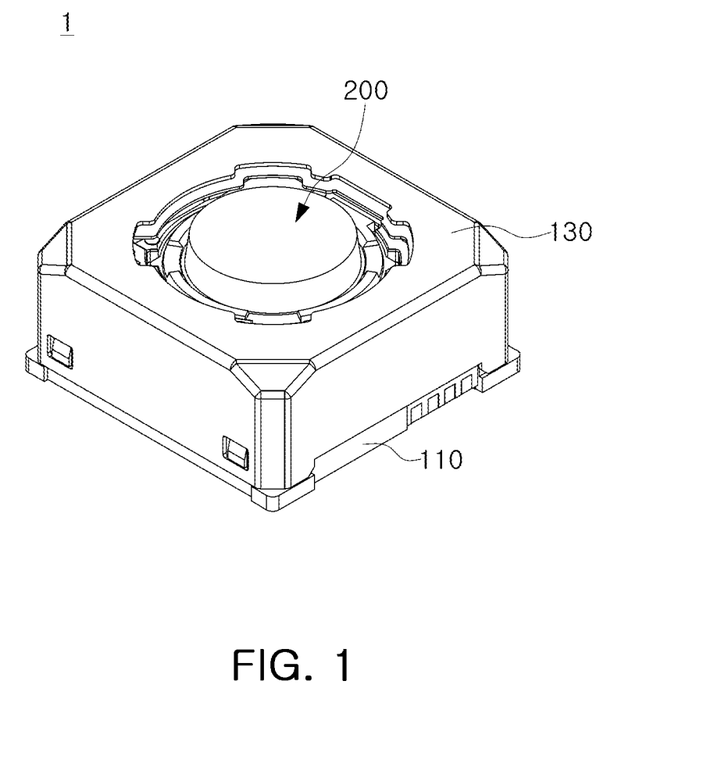
FIG. 1 is a perspective view of a camera module according to one or more examples.
Figure 2:
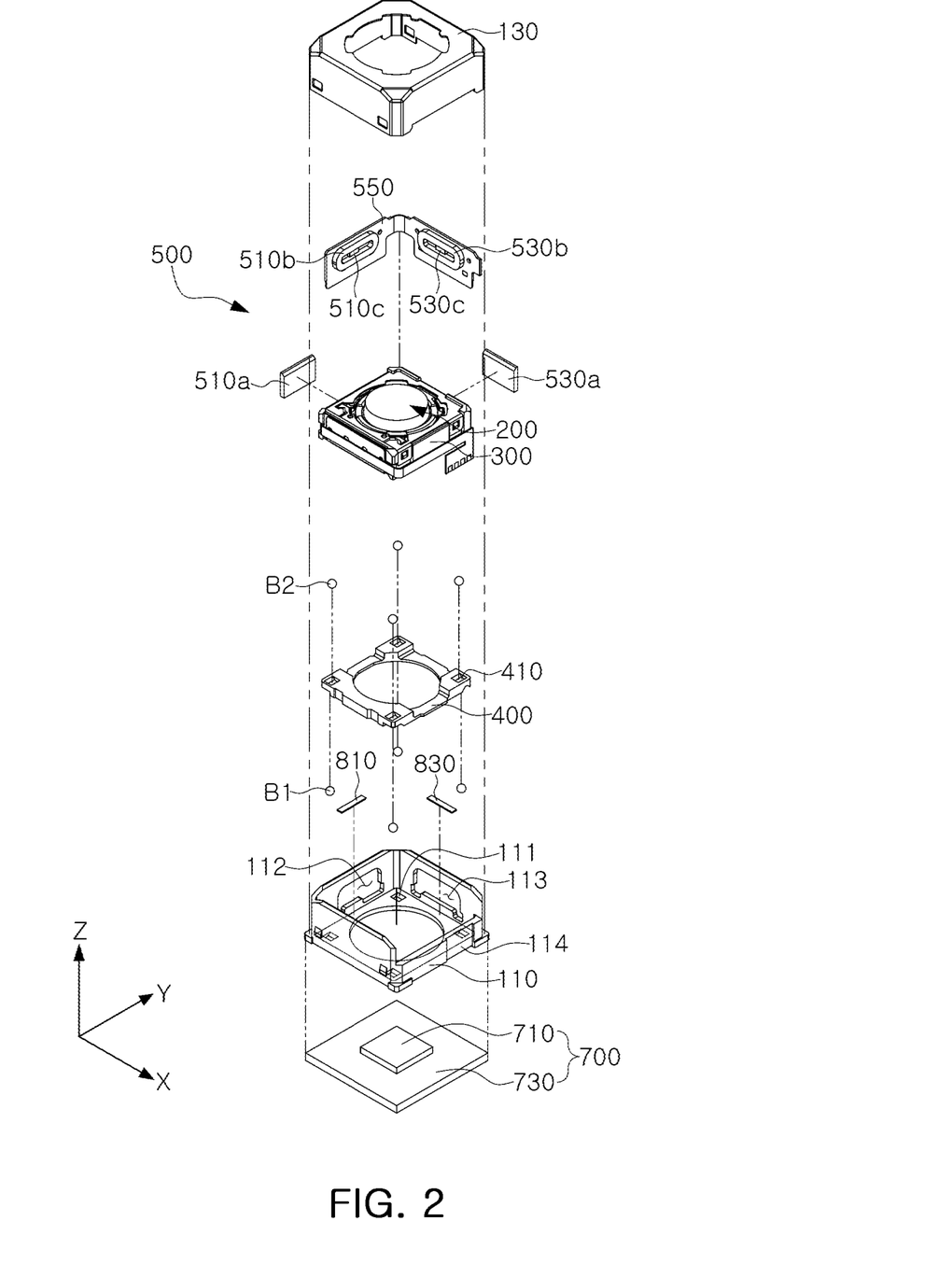
FIG. 2 is a schematic exploded perspective view of the camera module according to one or more examples.

FIG. 1 is a perspective view of a camera module according to one or more examples, and FIG. 2 is a schematic exploded perspective view of the camera module of FIG. 1.

Referring to FIGS. 1 and 2, a camera module 1 may include a lens module 200, a lens driving device for moving the lens module 200, an image sensor module 700 for converting light incident thereto through the lens module 200 into an electrical signal, a housing 110 accommodating the lens module 200 and the lens driving device therein, and a case 130 coupled to the housing 110.

Figure 3:
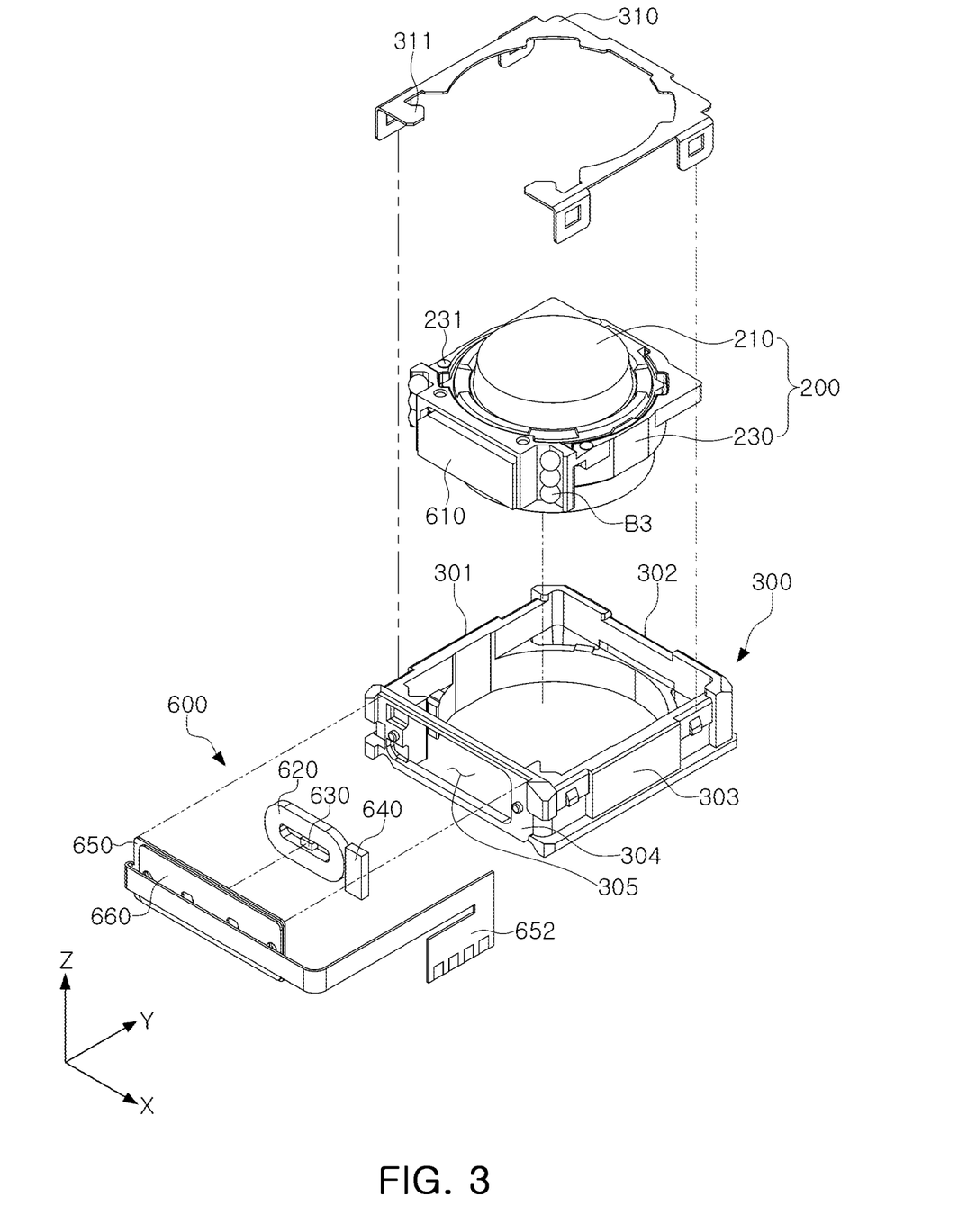
FIG. 3 is an exploded perspective view of a portion of the camera module according to one or more examples.

The lens module 200 may include a lens barrel 210 and a carrier 230 (see FIG. 3).

The lens barrel 210 may accommodate at least one lens capturing a subject. When a plurality of lenses are arranged, they may be mounted inside the lens barrel 210 on an optical axis. The lens barrel 210 has a hollow cylindrical shape and may be coupled to the carrier 230.

The lens module 200 may be accommodated in a lens holder 300.

The lens driving device may move the lens module 200.

As an example, the lens driving device moves the lens module 200 in an optical axis (a Z-axis) direction to focus lenses and moves the lens module 200 in a direction, perpendicular to the optical axis (the Z-axis), to correct shake when capturing an image.

The lens driving device may include a focusing unit 600 for focusing the lenses (See FIG. 3) and a shake correction unit 500 for correcting the shake.

The image sensor module 700 is a device for converting light, incident through the lens module 200, into an electrical signal.

As an example, the image sensor module 700 may include an image sensor 710 and a printed circuit board (PCB) 730 connected to the image sensor 710, and may further include an infrared filter.

The infrared filter cuts off light in an infrared region in the light incident thereto through the lens module 200.

The image sensor 710 converts light, incident thereto through the lens module 200, into an electrical signal. As an example, the image sensor 710 may be a charge-coupled device (CCD) or a complementary metal-oxide-semiconductor device (CMOS).

The electrical signal, converted by the image sensor 710, is output as an image through a display unit of a portable electronic device.

The image sensor 710 is fixed to the printed circuit board 730, and is electrically connected to the printed circuit board 730 by wire bonding.

The lens module 200 and the lens holder 300 are accommodated in the housing 110. As an example, the housing 110 has an open top and an open bottom, and the lens module 200 and the lens holder 300 are accommodated in an internal space of the housing 110.

An image sensor module 700 is disposed on the bottom of the housing 110.

The case 130 is coupled to the housing 110 to cover an external surface of the housing 110, and serves to protect the internal components of the camera module 1.

Hereinafter, the shake correction unit 500 of the lens driving device will be described with reference to FIG. 2.

The shake correction unit 500 is used to correct image blurring or moving picture shaking due to handshake, or the like, of a user when capturing an image or a moving picture.

For example, when a shake occurs at the time of capturing an image due to the handshake of the user, or the like, the shake correction unit 500 compensates for the shake by displacing the lens barrel 210 to be relatively displaced to correspond to the shake.

As an example, the shake correction unit 500 moves the lens module 200 in a direction, perpendicular to the optical axis (the Z axis), to correct the shake.

The shake correction unit 500 includes a frame 400, guiding the movement of the lens module 200, and a first magnet 510a and a first coil 510b and a second magnet 530a and a second coil 530b generating driving force in a direction perpendicular to an optical axis (the Z axis).

The first magnet 510a and the first coil 510b are disposed to face each other in a first axis direction (an X-axis direction), perpendicular to the optical axis (the Z axis), and the second magnet 530a and the second coil 530b are disposed to face each other in a second axis direction (a Y-axis direction), perpendicular to the optical axis (the Z-axis).

The frame 400 and the lens holder 300 are sequentially arranged in the housing 110 in the optical axis direction, and serve to guide the movement of the lens module 200. The lens module 200 is disposed in the lens holder 300.

The frame 400 and the lens holder 300 are moved in a direction perpendicular to the optical axis (the Z axis), with respect to the housing 110 by the driving force generated by the first and second magnets 510a and 530a and the first and second coils 510b and 530b.

The first magnet 510a and the first coil 510b generate driving force in the first axis direction (the X-axis direction), perpendicular to the optical axis (the Z axis), and the second magnet 530a and the second coil 530b generate driving force in the second axis direction (the Y-axis direction), perpendicular to the first axis (the X axis) and perpendicular to the optical axis (the Z axis). For example, the first magnet 510a and the first coil 510b generate driving force in a direction in which they face each other, and the second magnet 530a and the second coil 530b also generate driving force in a direction in which they face each other.

The second axis (the Y axis) is perpendicular to both the optical axis (the Z axis) and the first axis (the X axis).

The first and second magnets 510a and 530a are disposed to be orthogonal to each other in a plane, perpendicular to the optical axis (the Z axis), and the first and second coils 510b and 530b are also disposed to be orthogonal to each other on the plane, perpendicular to the optical axis (the Z axis).

The first and second magnets 510a and 530a are mounted on the lens holder 300.

The lens holder 300 has a first side surface 301, a second side surface 302, a third side surface 303, and a fourth side surface 304. The first side surface 301 and the second side surface 302 are perpendicular to each other, the third side surface 303 and the fourth side surface 304 are perpendicular to each other, the first side surface 301 and the third side surface 303 face each other, and the second side surface 302 and the fourth side surface 304 face each other.

The first magnet 510a is disposed on the first side surface 301 of the lens holder 300, and the second magnet 530a is disposed on the second side surface 302 of the lens holder 300.

The first and second coils 510b and 530b may be provided on a second substrate 550. As an example, the first and second coils 510b and 530b may be provided on a surface of the second substrate 550 to face the first and second magnets 510a and 530a.

The second substrate 550 is mounted on the housing 110. For example, the second substrate 550 may be in the form of a '¬'-shaped plane and may be mounted on two side surfaces of the housing 110.

The housing 110 has four side surfaces and, among the four side surfaces, at least two side surfaces are provided with openings 112 and 113. The second substrate 550 is mounted on two side surfaces provided with the openings 112 and 113.

During shake correction, the first and second magnets 510a and 530a are movable members, moving in the direction perpendicular to the optical axis (the Z axis) together with the lens holder 300, and the first and second coils 510b and 530b are fixed members fixed to the housing 110.

Since the lens module 200 is disposed in the lens holder 300, the lens module 200 is moved in the direction perpendicular to the optical axis (the Z axis) together with the lens holder 300.

The camera module 1 is provided with a plurality of ball members for supporting the frame 400 and the lens holder 300. The plurality of ball members serve to guide the movements of the frame 400 and the lens holder 300 in the shake correction process. The plurality of ball members also serve to maintain spacings between the housing 110, and the frame 400 and the lens holder 300.

Since the lens module 200 moves in the direction perpendicular to the optical axis (the Z axis) together with the lens holder 300, the movement of the lens module 200 may be supported by the plurality of ball members.

The plurality of ball members include first ball members B1 and second ball members B2.

The first ball members B1 support the movement of the frame 400 and the lens holder 300 in the first axis direction (the X-axis direction), and the second ball members B2 support the movement of the lens holder 300 in the second axis direction (the Y-axis direction).

For example, the first ball members B1 are moved in a rolling motion in the first axis direction (the X-axis direction) when the driving force is generated in the first axis direction (the X-axis direction). Therefore, the first ball members B1 guide the movement of the frame 400 and the lens holder 300 in the first axis direction (the X-axis direction).

The second ball members B2 are moved in a rolling motion in the second axis direction (the Y-axis direction) when the driving force is generated in the second axis direction (the Y-axis direction). Therefore, the second ball members B2 guide the movement of the lens holder 300 in the second axis direction (the Y-axis direction).

The first ball members B1 include a plurality of ball members, disposed between the housing 110 and the frame 400, and the second ball member B2 includes a plurality of ball members disposed between the frame 400 and the lens holder 300.

First guide groove portions 111, accommodating the first ball members B1 therein, are formed in at least one surface among surfaces of the housing 110 and the frame 400 facing each other in the optical axis direction (the Z-axis direction). The first guide groove portions 111 include a plurality of guide grooves, respectively corresponding to the plurality of ball members of the first ball members B1.

The first ball members B1 are accommodated in the first guide groove portions 111 and are fitted between the housing 110 and the frame 400.

Movement of the first ball members B1 is restricted in the optical axis direction (the Z-axis direction) and the second axis direction (the Y-axis direction), and the first ball members B1 may only be moved in the first axis direction (the X-axis direction), in a state in which the first ball members B1 are accommodated in the first guide groove portions 111. As an example, the first ball members B1 may be moved in a rolling motion in only the first axis direction (the X-axis direction).

To enable this, a planar shape of each of the plurality of guide grooves of the first guide groove portion 111 is a rectangular shape having a length in the first axis direction (the X-axis direction).

Second guide groove portions 410, accommodating the second ball members B2 therein, are formed in at least one surface among surfaces of the frame 400 and lens holder 300 facing each other in the optical axis direction (the Z-axis direction). The second guide groove portions 410 include a plurality of guide grooves, respectively corresponding to the plurality of ball members of the second ball members B2.

The second ball members B2 are accommodated in the second guide groove portions 410 and are fitted between the frame 400 and the lens holder 300.

Movement of the second ball members B2 is restricted in the optical axis direction (the Z-axis direction) and the first axis direction (the X-axis direction), and the second ball members B2 may only be moved in the second axis direction (the Y-axis direction), in a state in which the second ball members B2 are accommodated in the second guide groove portions 410. As an example, the second ball members B2 may be moved in a rolling motion in only the second axis direction (the Y-axis direction).

To enable this, a planar shape of each of the plurality of guide grooves of the second guide groove portion 410 is a rectangular shape having a length in the second axis direction (the Y-axis direction).

When driving force is generated in the first axis direction (the X-axis direction), the frame 400, the lens holder 300, and the lens module 200 are moved together in the first axis direction (the X-axis direction).

The first ball member B1 is moved in a rolling motion in the first axis direction (the X-axis direction). In this case, the movement of the second ball member B2 is restricted.

When driving force is generated in the second axis direction (the Y-axis direction), the lens holder 300 and the lens module 200 are moved in the second axis direction (the Y-axis direction).

The second ball member B2 is moved in a rolling motion in the second axis direction (the Y-axis direction). In this case, the movement of the first ball member B1 is restricted.

Since a third magnet 610 is mounted on the lens module 200 and a third coil 620 is mounted on the lens holder 300, the third magnet 610 and the third coil 620 are moved together with the lens module 200 and the lens holder 300 in a direction, perpendicular to the optical axis (the Z-axis direction), by driving force of the shake correction unit 500.

In the examples described herein, in a shake correcting process, a closed loop control manner of detecting and feeding back a position of the lens module 200 may be used.

Accordingly, position sensors 510*c* and 530*c* are provided to perform a closed loop control. Two position sensors 510*c* and 530*c* are provided, and are respectively disposed in hollow portions formed in the centers of the first and second coils 510*b* and 530*b* to face the first and second magnets 510*a* and 530*a*. The position sensors 510*c* and 530*c* may be hall sensors.

First and second yokes 810 and 830 are provided to maintain the shake correction unit 500 and the first and second ball members B1 and B2 in contact with each other.

The first and second yokes 810 and 830 are fixed to the housing 110, and are respectively disposed to face the first and second magnets 510*a* and 530*a* in the optical axis direction (the Z-axis direction).

Accordingly, attractive force is generated in the optical axis direction (the Z-axis direction) between the first yoke 810 and the first magnet 510*a* and between the second yoke 830 and the second magnet 530*a*.

Since the lens holder 300 and the frame 400 are pressed toward the first and second yokes 810 and 830 by attractive force between the first yoke 810 and the first magnet 510*a* and between the second yoke 830 and the second magnet 530*a*, the frame 400 and the lens holder 300 are maintained in a state in which they are in contact with each other.

The first and second yokes 810 and 830 are formed of a material generating the attractive force between the first yoke 810 and the first magnet 510*a* and between the second yoke 830 and the second magnet 530*a*. As an example, the first and second yokes 810 and 830 may be formed of a magnetic material.

FIG. 3 is an exploded perspective view of a portion of the camera module according to one or more examples.

FIG. 3 is an exploded perspective view of a portion of the camera module according to an example embodiment.

Hereinafter, a focusing unit 600 of the lens driving device will be described with reference to FIG. 3.

The lens driving device moves the lens module 200 to focus lenses on a subject.

As an example, the camera module 1 includes a focusing unit 600 for moving the lens module 200 in the optical axis direction (the Z-axis direction).

The lens module 200 includes a lens barrel 210 and a carrier 230.

The focusing unit 600 includes a lens holder 300, accommodating the lens module 200 therein, and a third magnet 610 and a third coil 620 for generating driving force to move the lens module 200 in the optical axis direction (the Z-axis direction).

The third magnet 610 is mounted on the lens module 200. As an example, the third magnet 610 may be mounted on a side surface of the carrier 230.

A third coil 620 is provided on the first substrate 650. As an example, the third coil 620 is provided on a surface of the first substrate 650. The first substrate 650 is mounted on the fourth side surface 304 of the lens holder 300 such that the third magnet 610 and the third coil 620 face each other in the direction perpendicular to the optical axis (the Z axis).

The fourth side surface 304 of the lens holder 300 is provided with an opening 305, and the first substrate 650 is mounted on the fourth side surface 304 provided with the opening 305.

Since the third coil 620 is provided on the first substrate 650 mounted on the side surface of the lens holder 300 and the first and second coils 510*b* and 530*b* are provided on the second substrate 550 mounted on the side surface of the housing 110, the third coil 620 may be disposed to be closer to the optical axis of the lens module 200 than the first and second coils 510*b* and 530*b*.

When focusing lenses, the third magnet 610 is a movable member mounted on the lens module 200 and moved in the optical axis direction (the Z-axis direction), and the third coil 620 is a fixed member fixed to the lens holder 300.

When power is applied to the third coil 620, the lens module 200 is moved in the optical axis direction (the Z-axis direction) by an electromagnetic interaction between the third magnet 610 and the third coil 620.

Rolling members B3 are disposed between the lens holder 300 and the lens module 200 to reduce friction between the lens holder 300 and the lens module 200 when the lens module 200 is moved. The rolling member B3 may have a ball shape.

The rolling members B3 are disposed on opposite sides of the third magnet 610.

A yoke 660 is disposed to face the third magnet 610 in the direction perpendicular to the optical axis (the Z axis). As an example, the yoke 660 is mounted on the other surface of the first substrate 650. Therefore, the yoke 660 is disposed to face the third magnet 610 with the third coil 620 interposed therebetween.

Attractive force acts in the direction perpendicular to the optical axis (the Z axis), between the first yoke 660 and the third magnet 610.

Therefore, the rolling members B3 are maintained in a state in which they are held in contact with the lens holder 300 and the lens module 200 by the attractive force between the yoke 660 and the third magnet 610.

In addition, the yoke 660 serves to focus magnetic force of the third magnet 610. Therefore, generation of a leakage magnetic flux may be prevented.

As an example, the yoke 660 and the third magnet 610 form a magnetic circuit.

In examples described herein, a closed loop control manner of detecting and feeding back a position of the lens module 200 may be used.

Therefore, a position sensor 630 is provided to perform a closed loop control. The position sensor 630 is disposed in a hollow portion formed in the center of the third coil 620 to face the third magnet 610. The position sensor 630 may be a hall sensor. A driver integrated circuit (IC) 640 may be mounted on a surface of the first substrate 650.

A stopper 310 is coupled to the lens holder 300 to cover at least a portion of an upper surface of the carrier 230.

The stopper 310 may prevent the lens module 200 from being externally separated from the lens holder 300 due to an external impact or the like.

The carrier 230 is provided with one or more shock absorbing members 231. As an example, the one or more shock absorbing members 231 may be provided on the upper surface of the carrier 230. The shock absorbing members 231 may be an elastic material. As an example, the shock absorbing members 231 may be formed of a rubber material. The shock absorbing members 231 may reduce impacts and collision noise generated when the carrier 230 and the stopper 310 collide.

The stopper 310 has a protrusion 311 covering an upper portion of the rolling member B3. Accordingly, the rolling member B3 is prevented from being externally separated from the lens holder 300.

Figure 4:
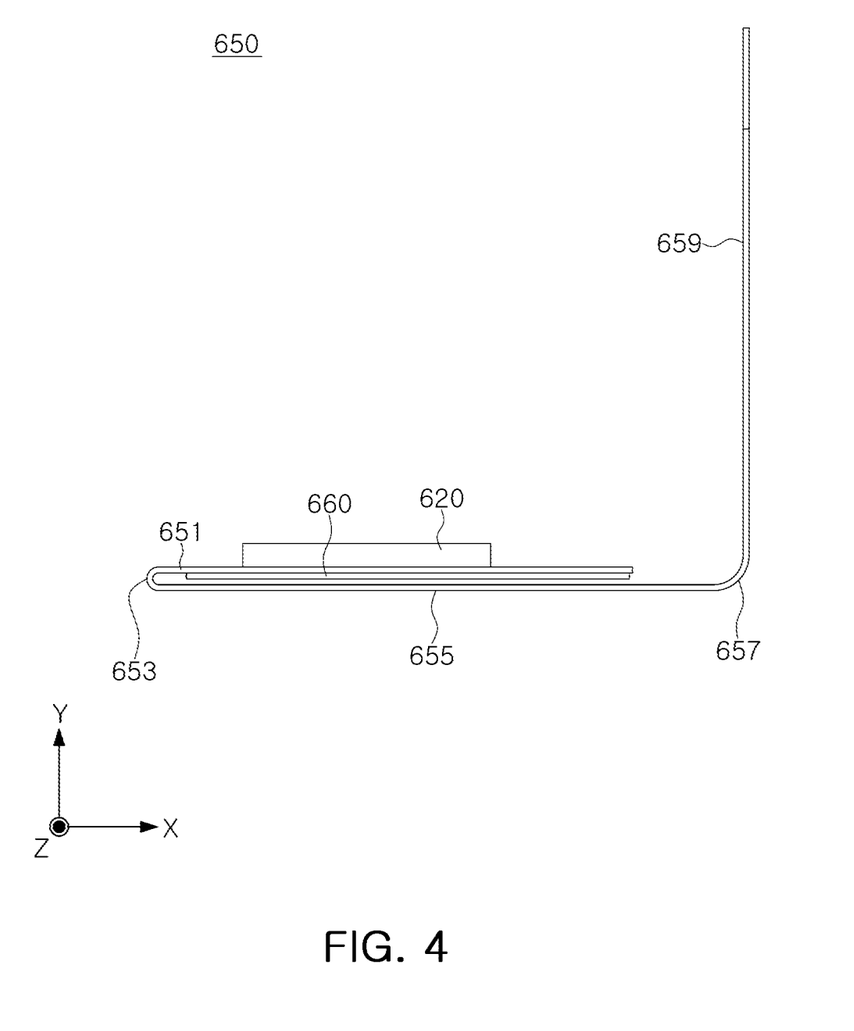
FIG. 4 is a plan view of one or more examples of a first substrate.
Figure 5:
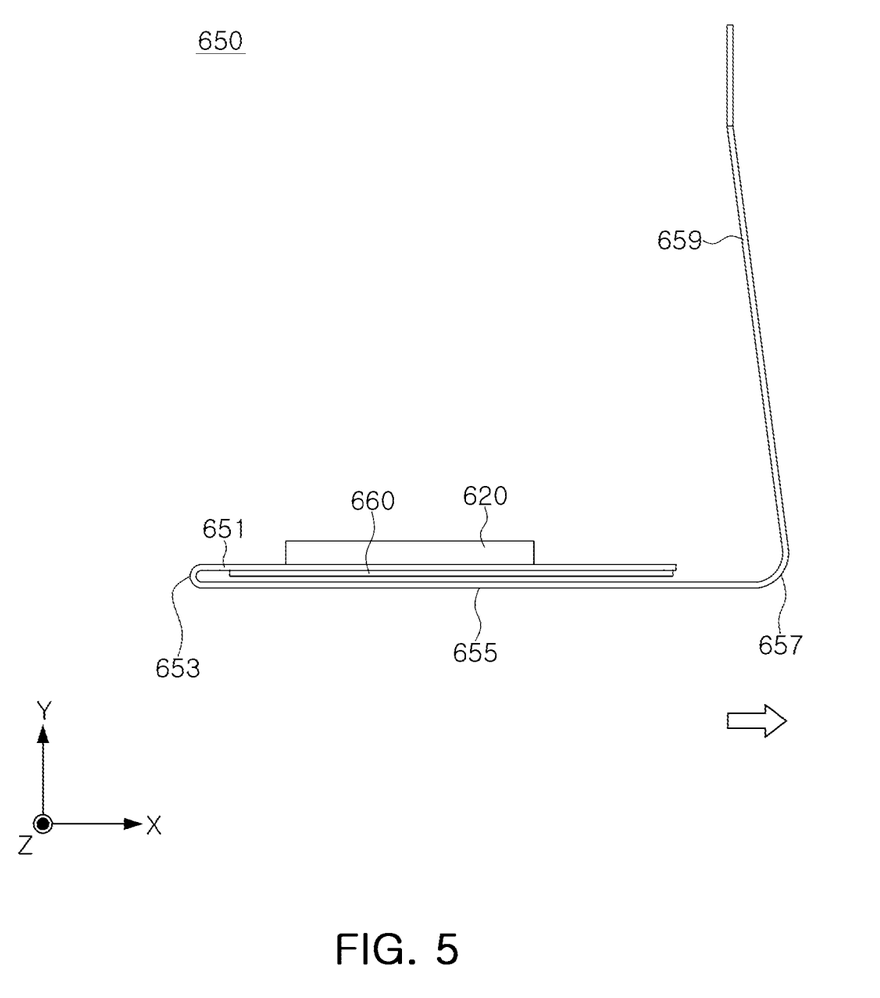
FIGS. 5 and 6 are schematic views illustrating example movement of the first substrate.
Figure 6:
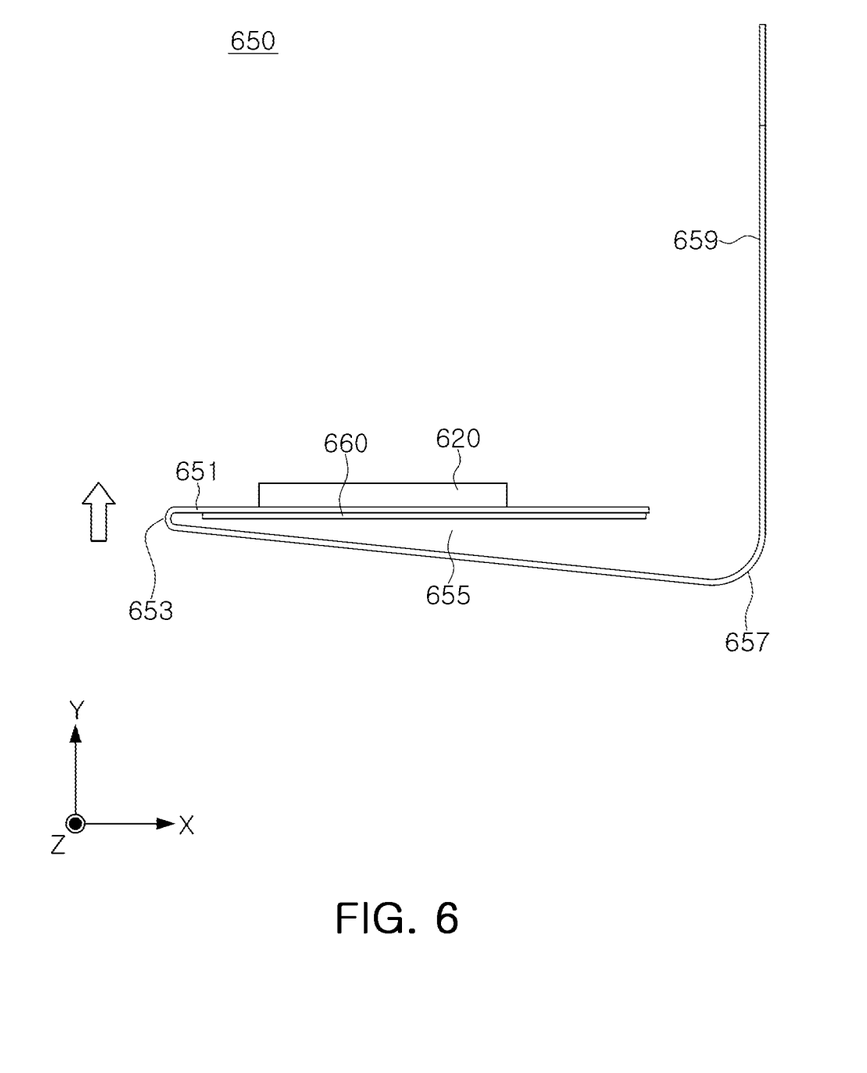

FIG. 4 is a plan view of one or more examples of a first substrate, and FIGS. 5 and 6 are schematic views illustrating example movement of the first substrate.

The first substrate 650 may be mounted on the lens holder 300 and may be moved in a direction perpendicular to an optical axis (a Z-axis) direction, together with the lens holder 300. A portion of the first substrate 650 is connected to the housing 110, and the first substrate 650 is moved in the direction perpendicular to the optical axis (the Z-axis direction), by driving force of the shake correction unit 500 in a state in which a portion of the substrate 650 is connected to the housing 110.

The first substrate 650 may be a flexible circuit board, and includes a body portion 651, an extension portion, and a connection portion 652.

A third coil 620 is provided on one surface of the body portion 651, and a yoke 660 is provided on the other surface of the body portion 651. The body portion 651 is mounted on a fourth side surface 304 provided with an opening 305 among side surfaces of the lens holder 300.

The extension portion is bent to extend from the body portion 651. The extension portion includes a first extension portion 655 and a second extension portion 659. The first extension portion 655 is bent to extend from one side of the body portion 651, and the second extension portion 659 is bent to extend from the first extension portion 655.

The first extension portion 655 is disposed to be spaced apart from the other surface of the body portion 651, and the body portion 651 and the first extension portion 655 are connected by a first bent portion 653. The first bent portion 653 may be bent in a 'U' shape to connect one side end of the body portion 651 and one side end of the first extension portion 655 to each other.

The first extension portion 655 has a greater length than the body portion 651. As an example, the length of the first extension portion 655 in the direction perpendicular to the optical axis (the Z axis), is greater than the length of the body portion 651 in the direction perpendicular to the optical axis (the Z axis).

A second extension portion 659 is disposed to be spaced apart from a third side surface 303 of the lens holder 300, and the second extension portion 659 and the first extension portion 655 are connected by a second bent portion 657. The second bent portion 657 is bent to connect the other side end of the first extension portion 655 and one side end of the second extension portion 659 to each other. The other side end of the second extension 659 is mounted on the housing 110.

The connection portion 652 is provided on the other side end of the second extension portion 659. For example, the connection portion 652 may extend in a direction downward from the other side end of the second extension portion 659 (a direction toward a printed circuit board 730).

The connection portion 652 may be configured to receive an electrical signal from an external component (for example, the printed circuit board 730).

The first substrate 650 is connected to the printed circuit board 730 through the connection portion 652.

The connection portion 652 is inserted into a side surface of the housing 110. The connection portion 652 is disposed in a groove portion 114 to be mounted on the housing 110.

During shake correction, the first substrate 650 may be moved in the direction perpendicular to the optical axis (the Z axis), together with the lens holder 300.

In addition, during the shake correction, the lens module 200, the lens holder 300, the third magnet 610 and the third coil 620 may be moved together in the direction perpendicular to the optical axis (the Z axis).

When the lens holder 300 is moved in the direction perpendicular to the optical axis (the Z axis), the first substrate 650 is moved in the direction perpendicular to the optical axis (the Z axis), in a state in which the connection portion 652 is connected to the printed circuit board 730.

When driving force is generated in a first axis direction (an X-axis direction), the lens holder 300 is moved in the first axis direction (the X-axis direction) and the first substrate 650, mounted on the lens holder 300, is moved in the first axis direction (the X-axis direction) together with the lens holder 300.

The second extension portion 659 is bent from the first extension portion 655 to be spaced apart from the third side surface of the lens holder 300. Therefore, when the driving force is generated in the first axis direction (the X-axis direction), the second extension portion 659 is moved in the first axis direction (the X-axis direction) to significantly reduce tension applied to the first substrate 650 (see FIG. 5).

When the driving force is generated in the second axis direction (the Y-axis direction), the lens holder 300 is moved in the second axis direction (the Y-axis direction) and the first substrate 650, mounted on the lens holder 300, is moved in the second axis direction (the Y-axis direction) together with the lens holder 300.

The first extension portion 655 is bent from the body portion 651 to be spaced apart from the other surface of the body portion 651. Therefore, when driving force is generated in the second axis direction (the Y-axis direction), the first extension portion 655 is move in the second axis direction (the Y-axis direction) to significantly reduce tension applied to the first substrate 650 (see FIG. 6).

The camera module 1 according to the examples described herein is configured such that a relative position of the magnet 510a and the first coil 510b (a position of the magnet 510a and the first coil 510b in the optical axis direction (the Z-axis direction)) and a relative position of the second magnet 530a and the second coil 530b (a position of the second magnet 530a and the second coil 530b in the direction of the optical axis (Z axis)) do not vary even when the lens module 200 is moved in the optical axis direction (the Z-axis direction) during a focusing operation. Therefore, driving force for shake correction may be precisely controlled.

Furthermore, a relative position of the third magnet 610 and the third coil 620 (a position of the third magnet 610 and the third coil 620 in the direction perpendicular to the optical axis (the Z axis)) does not vary even when the lens module 200 is moved in the direction perpendicular to the optical axis (the Z axis), during the shake correction operation. Therefore, driving force for focusing operation may be precisely controlled.

As described above, a camera module according to the examples disclosed herein, may improve focusing performance and shake correction performance.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a lens holder accommodating a lens module therein;
a housing accommodating the lens module and the lens holder therein;
a shake correction unit comprising first and second magnets, disposed in the lens holder, and first and second coils disposed to face the first and second magnets;
a focusing unit comprising a third magnet, disposed in the lens module, and a third coil disposed on a first substrate disposed on the lens holder; and
a plurality of ball members configured to support movement of the lens module in a direction perpendicular to an optical axis,
wherein the lens module, the lens holder, the third magnet, and the third coil are moved together in the direction perpendicular to the optical axis, by driving force of the shake correction unit,
wherein the first substrate comprises a body portion, provided with the third coil, and an extension portion bent to extend from the body portion,
wherein the extension portion comprises a first extension portion, bent about a direction parallel to the optical axis direction to extend from one side of the body portion to be spaced apart from the body portion, and a second extension portion bent about another direction parallel to the optical axis direction to extend from the first extension portion, which is perpendicular to the first extension portion.

2. The camera module of claim 1, wherein the first substrate is moved in the direction perpendicular to the optical axis, by the driving force of the shake correction unit in a state in which a portion of the first substrate is connected to the housing.

3. The camera module of claim 1, wherein the second extension portion is disposed to be spaced apart from a side surface of the lens holder.

4. The camera module of claim 1, wherein the second extension portion comprises a connection portion configured to receive an electrical signal from an external component, and the connection portion is disposed on the housing.

5. The camera module of claim 1, wherein the first extension portion is moved in a second axis direction perpendicular to the optical axis, by driving force generated by the second magnet and the second coil.

6. The camera module of claim 5, wherein the second extension portion is moved in a first axis direction perpendicular to the optical axis, by driving force generated by the first magnet and the first coil.

7. The camera module of claim 1, wherein the lens module comprises a lens barrel and a carrier coupled to the lens barrel, and
wherein a rolling member is disposed between the carrier and the lens holder.

8. The camera module of claim 7, wherein a stopper, covering at least a portion of an upper surface of the carrier, is disposed on the lens holder.

9. The camera module of claim 8, wherein the stopper comprises a protrusion covering an upper portion of the rolling member.

10. The camera module of claim 1, wherein the third coil is disposed closer to an optical axis of the lens module than the first and second coils.

11. The camera module of claim 1, wherein the shake correction unit further comprises a frame for guiding the movement of the lens module,
wherein the frame, the lens holder, and the lens module are moved together in a first axis direction perpendicular to the optical axis, by driving force generated by the first magnet and the first coil, and
wherein the lens holder and the lens module are moved in a second axis direction perpendicular to the optical axis, by driving force generated by the second magnet and the second coil.

12. A camera module comprising:
a lens holder accommodating a lens module therein;
a housing accommodating the lens module and the lens holder therein;
a shake correction unit comprising first and second magnets, disposed in the lens holder, and first and second coils disposed to face the first and second magnets;
a focusing unit comprising a third magnet, disposed in the lens module, and a third coil disposed on a first substrate disposed on the lens holder; and
a plurality of ball members configured to guide movement of the lens module in a direction perpendicular to an optical axis,
wherein the first substrate is moved in the direction perpendicular to the optical axis, by driving force of the shake correction unit in a state in which a portion of the first substrate is connected to the housing,
wherein the first substrate comprises a body portion, provided with the third coil, and an extension portion bent to extend from the body portion,
wherein the extension portion comprises a first extension portion, bent about a direction parallel to the optical axis direction to extend from one side of the body portion to be spaced apart from the body portion, and a second extension portion bent about another direction parallel to the optical axis direction to extend from the first extension portion, which is perpendicular to the first extension portion.

13. The camera module of claim 12, wherein the lens module, the lens holder, the third magnet, and the third coil are moved together in the direction perpendicular to the optical axis, by the driving force of the shake correction unit.

14. The camera module of claim 12,
wherein the first extension portion is moved in a second axis direction perpendicular to the optical axis, by driving force generated by the second magnet and the second coil.

15. The camera module of claim 14, wherein the second extension portion is moved in a first axis direction perpendicular to the optical axis, by driving force generated by the first magnet and the first coil.

16. A camera module comprising:
a lens holder disposed in a housing and configured to move in first and second directions perpendicular to an optical axis direction relative to the housing;
a lens module disposed in the lens holder and configured to move in the optical axis direction relative to the lens holder;
a substrate disposed on the lens holder comprising a body portion configured to move with the lens holder and a connection portion connected to the housing; and
a driving coil disposed on the body portion to face a driving magnet on the lens module to drive the lens module in the optical axis direction,
wherein the substrate comprises a first extension portion extending from a first bent portion connected to a side of the body portion to a second bent portion, and a second extension portion extending from the second bent portion to the connection portion, wherein the first bent portion is bent about a direction parallel to the optical axis direction, and wherein the second bent portion is bent about another axis extending in a direction parallel to the optical axis direction.

17. The camera module of claim 16, wherein the first extension portion is configured to move in the first direction relative to the body portion and the second extension portion in response to the lens holder movement in the first direction, and wherein the second extension portion is configured to move in the second direction relative to the first extension portion and the connection portion in response to the lens holder movement in the second direction.

18. The camera module of claim 16, further comprising first and second magnets, disposed in the lens holder, and first and second coils disposed to face the first and second magnets to drive the lens holder in the first and second directions.

\* \* \* \* \*